United States Patent [19]
Palumbo et al.

[11] Patent Number: 4,606,359

[45] Date of Patent: Aug. 19, 1986

[54] HAIRPIECE CONSTRUCTION

[75] Inventors: Albert J. Palumbo, Los Angeles, Calif.; Chen Kuo Chao, Hong Kong, Hong Kong

[73] Assignee: West Coast Hair Products, Inc., Los Angeles, Calif.

[21] Appl. No.: 272,341

[22] Filed: Jun. 10, 1981

[51] Int. Cl.[4] ............................................. A41G 3/00
[52] U.S. Cl. ........................................ 132/53; 132/5
[58] Field of Search ................................ 132/5, 53, 54

[56]     References Cited
U.S. PATENT DOCUMENTS

| | | | |
|---|---|---|---|
| 2,233,100 | 2/1941 | Jevnikar | 132/53 |
| 2,661,749 | 12/1953 | Corsillo | 132/54 |
| 3,037,261 | 6/1962 | Hess | 132/53 X |
| 3,521,648 | 7/1970 | Capparelli et al. | 132/53 |
| 3,589,376 | 6/1971 | Kohler | 132/53 |
| 3,905,378 | 9/1975 | Levin | 132/5 |

Primary Examiner—Gregory E. McNeill
Attorney, Agent, or Firm—George J. Netter

[57]     ABSTRACT

An improved hairpiece foundation means, characterized by a sheetlike fibrous woven fabric base having spaces between adjacent fibers; and a further fibrous sheetlike woven fabric member having air spaces between adjacent fibers sonically welded to the base along a plurality of mutually spaced lines. The hairpiece of the invention provides a continuous breathing relationship for the head of the wearer of the hairpiece as well as reducing the contact of adhesive used to secure the hairpiece to the head of the user with the hairs composing the hairpiece and thereby obviating a source of damage to the hairpiece.

11 Claims, 6 Drawing Figures

HAIRPIECE CONSTRUCTION

The present invention relates generally to an improved hairpiece construction and method of making the same.

BACKGROUND

A successful hairpiece is one which can be easily and tightly secured onto the head of the wearer and in such manner that the securement means does not tend to destroy or deteriorate the hairpiece. It is also desirable that the hairpiece be vented sufficiently as to be cool and comfortable when worn. All known prior hairpieces have not been fully satisfactory in one or both of these respects.

SUMMARY OF THE INVENTION

In the practice of the present invention there is provided a hairpiece in which the individual hairs forming the hairpiece are affixed to the cross-over points of a woven foundation or base. The fibers of the base are mutually spaced providing breathing or venting holes therebetween. In accordance with a first form of the invention, a second woven material strip or band is applied onto the lower surface of the foundation base forming a reinforced edge margin. This rim or edge margin member is affixed to the base by sonic welding along a plurality of mutually spaced lines extending both from the outer peripheral edge inwardly as well as transversely thereto.

According to a further form, in addition to the base layer to which the hairs are affixed a second woven sheetlike member which is of substantially the same dimensions and geometry as the base or foundation is laid down onto the lower surface of the first base in continuous contacting relation and affixed thereto by a plurality of lines of weldment achieved by sonic means. The construction of both of the versions of the invention provides a continuous breathing relationship for the head of the wearer of the hairpiece as well as reducing the contact of adhesive used to secure the hairpiece to the head of the user with the hairs composing the hairpiece and thereby obviating a source of damage to the hairpiece.

The first step in the method of this invention is to mold the foundation or base layer to the desired shape for conforming substantially to the head of a user. Next, a reinforcing rim or alternatively an entire reinforcing sheet, cut to the proper dimensions and geometry is laid down onto the concave surface of the fundation and secured thereto by a plurality of sonically produced lines of weldment. After spraying the composite construction with water, it is placed on a properly contoured surface and heated to an elevated temperature until a unitary construction is formed. The last step is the application of the hair to hairpiece base so formed.

DESCRIPTION OF PREFERRED EMBODIMENTS

Figure 1:
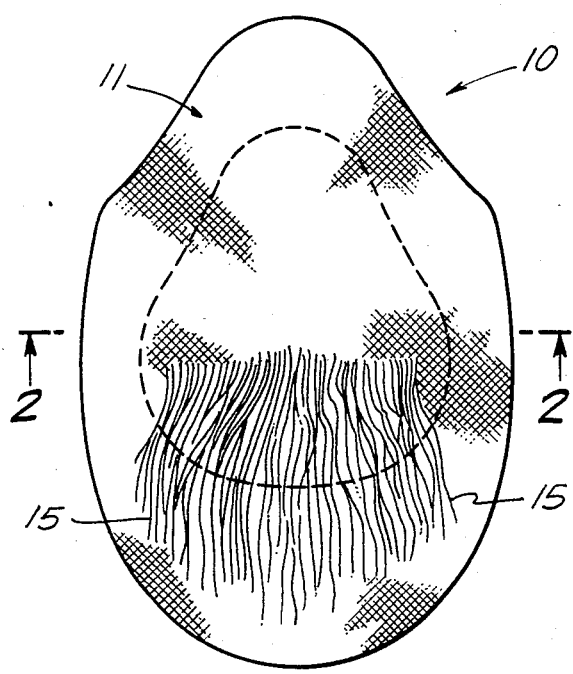
FIG. 1 is a top plan view of the hairpiece of the present construction.
Figure 3:
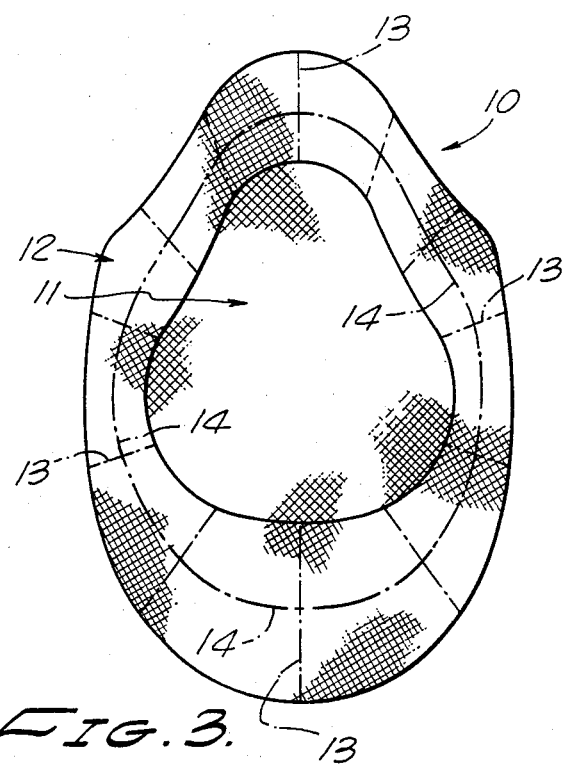
FIG. 3 is a bottom plan view of the hairpiece in FIG. 1.
Figure 2:
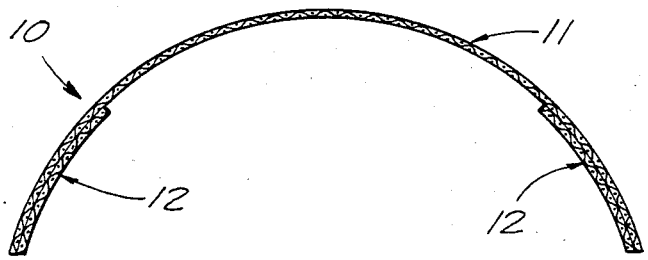
FIG. 2 is a sectional, elevational view of one version of the invention taken along the line 2—2 of FIG. 1.
Figure 4:
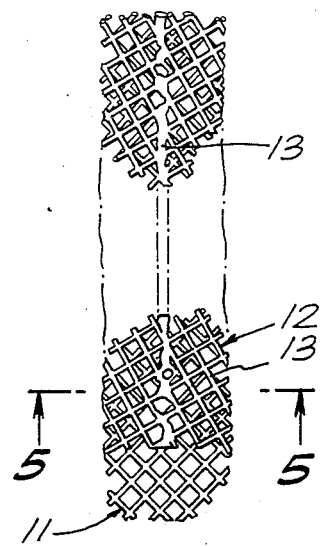
FIG. 4 is a greatly enlarged, partially fragmentary view showing a line of weldment for securement of parts together.

With reference now to the drawings and particularly FIGS. 1-3, the hairpiece of this invention is shown generally as at 10 and is seen to include a first base or foundation layer 11 which is preferably constructed of a woven material where the individual fibers forming the layer are spaced providing intervening air holes. Although other materials may be found useful and advantageous for constructing the foundation layer, best results to date have been obtained with a fabric woven from a plastic material which is deformable by heat and pressure, such as nylon monofilament, for example.

As an initial step, the foundation 11 is shaped to the desired contour of the head of the hairpiece wearer by molding it on an appropriately curved male form with the use of pressure and heat.

In accordance with the first verion of the invention, a continuous rim or edge margin strip 12 is formed from a second sheet of woven material, which material can be identical to that of which the foundation layer 11 is made. This reinforcing and protective margin or rim strip is placed in contacting relationship to the lower surface of the foundation or base layer 11 with the edges being cut so as to be substantially coextensive with the entire periphery of the foundation layer. The rim or margin strip is affixed to the foundation layer by contacting the two layers with a sonic tool which serves to bond the threads of the two pieces together into a plurality of linear weldments 13. These lines of sonic weldment preferably should include both lines which extend inwardly from the outer peripheral edge of the rim as including certain weldment lines 14 which extend transversely thereof.

The foundation layer 11 with sonically welded rim 11 intact thereon is then sprayed with water and placed on a properly contoured male form. Next, the composite structure while still on the form is heated to a temperature of approximately 185° C. which causes a certain amount of securement between the lines of weldment, as well as contouring the rim strip to conform with the foundation layer. By this means, a unitary structure is obtained and any tendency for wrinkling or bulging between weldment lines is prevented.

The final step is to secure the individual hairs 15 to the composite foundation, which may be in any conventional but preferably by tying to the fiber cross-over points on the foundation.

When it is desired to place the hairpiece on the head of the wearer quantities of adhesive material may be placed onto the head of the wearer or on the inner surface of the rim or margin layer, and the hairpiece pressed into place. Since the adhesive is not applied directly onto the ends of the hairs as results in certain prior known constructions, the undesirable result of pulling the hairs from the hairpiece is avoided.

Figure 6:
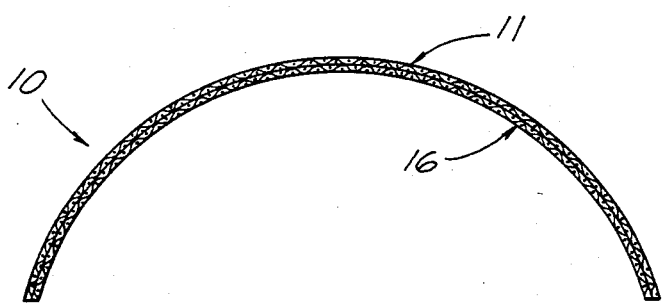
FIG. 6 is a sectional, elevational view of a further embodiment of the invention.
Figure 5:
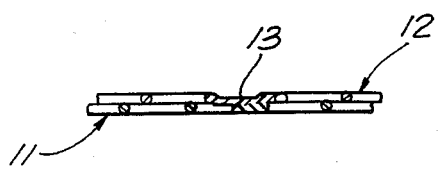
FIG. 5 is a sectional, elevational view taken along the line 5—5 of FIG. 4.

In accordance with a second version of the invention as best shown in FIG. 6, instead of the rim or edge margin layer, a complete coextensive layer 16 of substantially identical geometry and dimensions to the foundation layer is applied over the concave side of the foundation layer. The two layers are then secured together by a plurality of weldment lines produced by sonic means which lines extend across the entire areal extend of the two layers both in a set running from a front edge to a back edge, as well as several lines extending transversely across the hairpiece complete width. The composite foundation is then water sprayed and heated as before resulting in a unitary structure. Hair is also applied as previously indicated.

In effecting welding of the fabric parts together sonic means are utilized. That is, a tool is brought into contact with fabrics at the desired location for a weldment and it is vibrated sonically (or ultrasonically) which causes the plastic threads to be welded together. Equipment for accomplishing this is well-known and a detailed disclosure was therefore not provided here.

We claim:

1. An improved hairpiece foundation means, comprising:
    a sheetlike fibrous woven fabric base having spaces between adjacent fibers; and
    a further fibrous sheetlike woven fabric member having air spaces between adjacent fibers sonically welded to the base along a plurality of mutually spaced lines.

2. An improved hairpiece foundation means as in claim 1, in which the further sheetlike member is a continuous elongated strip arranged along the peripheral edge margin of the base.

3. An improved hairpiece foundation means as in either of claims 1 or 2, in which the weldment lines are produced by a sonically vibrating tool.

4. An improved hairpiece foundation means as in claim 1, in which the further sheetlike member is of substantially the same dimensions and geometry as the woven fabric base.

5. An improved hairpiece foundation means as in either of claims 1 or 4, in which the base and further sheetlike member are constructed of monofilament nylon.

6. An improved hairpiece foundation means as in either of claims 1 or 4, in which certain of the weldment lines extend transversely of the others.

7. A method of making a hairpiece foundation comprising the steps of:
    molding a sheet of woven synthetic plastic filaments having air spaces between adjacent filaments into a shape having a major concave surface and a major convex surface;
    laying a further extent of woven synthetic plastic filaments having air spaced between adjacent filaments onto the sheet concave surface;
    sonically welding the woven extent and sheet together along a plurality of lines;
    applying a quantity of water to the welded extent and sheet;
    locating the wet welded extent and sheet onto a curved mold; and
    heating the welded extent and sheet until the contacting surfaces between the weldment lines are secured to one another.

8. A method as in claim 7, in which the woven extent is in the form of a strip which is arranged along the peripheral edge margin of the woven sheet concave surface.

9. A method as in claim 7, in which the woven extent is of substantially the same dimensions and geometry as the woven sheet.

10. A method as in claim 7, in which the water is applied by spraying.

11. A method as in claim 7, in which the welded extent and sheet are heated to about 185° C.

* * * * *